Oct. 27, 1959
C. VAN DER LELY ET AL
2,910,300
ENDLESS BELT SPREADING DEVICE
Filed May 10, 1955
2 Sheets-Sheet 2
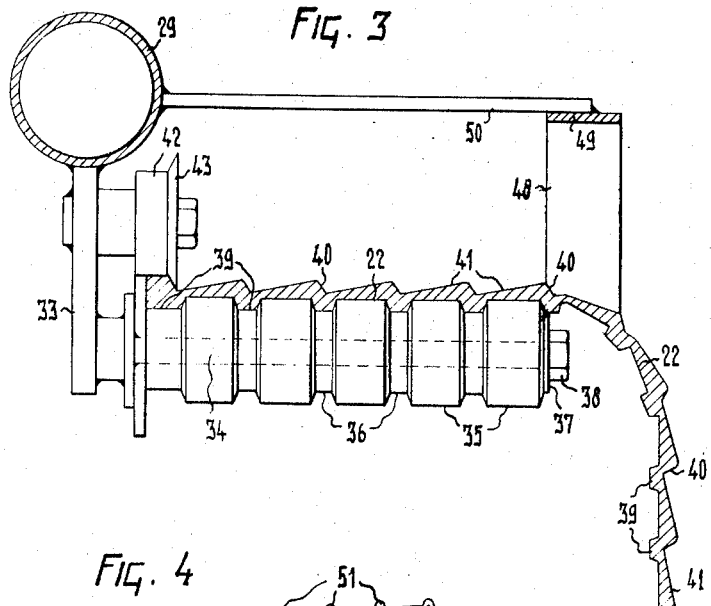
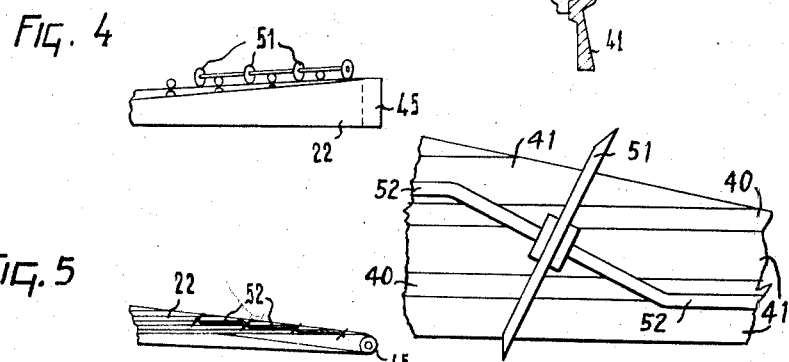
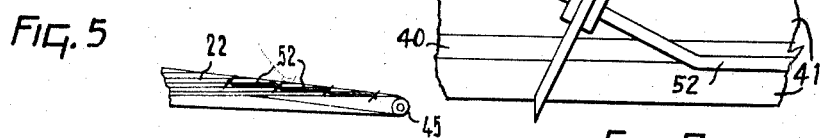
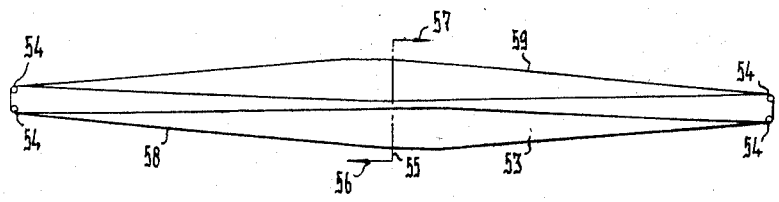

United States Patent Office 2,910,300
Patented Oct. 27, 1959

2,910,300

ENDLESS BELT SPREADING DEVICE

Cornelis van der Lely and Ary van der Lely, Maasland, Netherlands, assignors to C. van der Lely N.V., Maasland, Netherlands, a Dutch limited company Application May 10, 1955, Serial No. 507,414

Claims priority, application Netherlands May 13, 1954

11 Claims. (Cl. 275—2)

The invention relates to spreading devices of the type provided with one or more endless conveyor belts arranged at an angle to the direction of travel of the associated device for conveying fertilizer.

It is an object of the invention to provide a very simple and very reliable spreading device of the above-noted kind described. According to the invention a spreading device for distributing fertilizer or like material comprises: a frame, rollers mounted on said frame, at least one endless conveyor belt supported on said rollers, the longitudinal direction of the belt forming an angle with a vertical plane aligned in the direction of travel of the device, a container for containing the fertilizer to be spread, said container being mounted on said frame, means mounted on said container for covering said belt with fertilizers, means for moving said belt provided fertilizers in a predetermined direction over said rollers, and a row of points of support for a portion of said belt, each point of support being mounted on the frame, of the device, said row making an angle with the longitudinal direction of the belt, said row dividing said portion of the belt in two triangular halves arranged substantially in two planes which make an angle one with the other, one of said halves being arranged for carrying fertilizer in the longitudinal direction of the device, the other of said halves lying as a whole below the plane of said first half.

Figure 1:
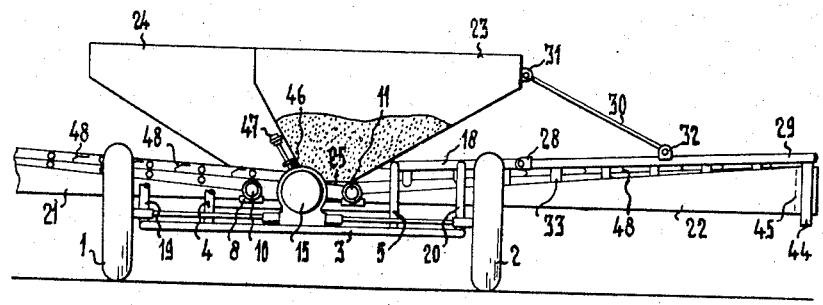
Figure 2:
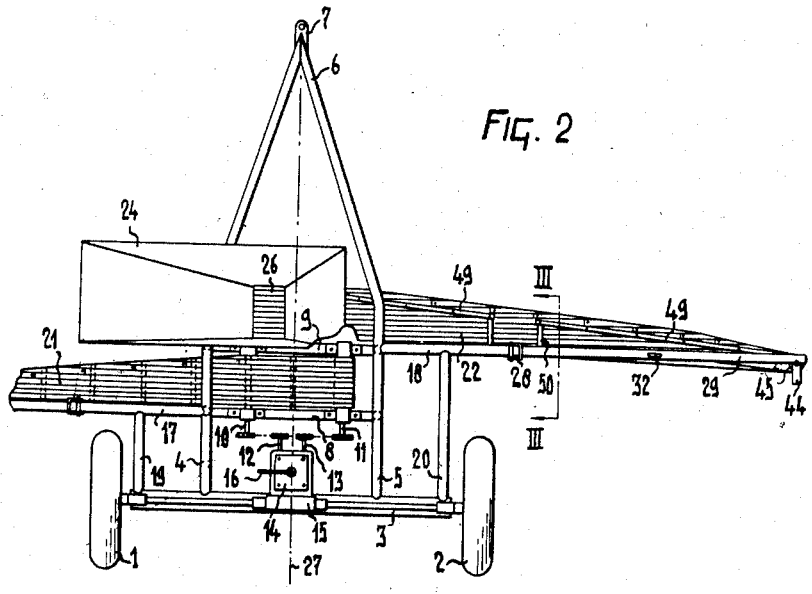

Further features and details will be hereinafter more fully described with reference to the accompanying drawings in which a preferred embodiment of the invention is illustrated by way of example and in which:

Fig. 1 is a rear view of a fertilizer spreading device according to the invention which is suitable for being fixed behind a tractor, Fig. 2 is a top view of the device of Fig. 1, Fig. 3 represents a section through a part of the device according to line III—III in Fig. 2, Figs. 4 and 5 show respectively a rear view and a plan view of a second embodiment of the scraping member shown in detail in Fig. 7, Fig. 6 shows diagrammatically a plan view of the arrangement of a belt in another embodiment of the invention, and Fig. 7 shows, in enlarged scale, a detail of the scraping member.

According to Figs. 1 and 2, the spreading device includes a frame supported by two wheels 1 and 2. The frame includes a bridge 3 from which beams 4 and 5 extend forward. These beams are partially parallel to each other, but converge at the front of the device. They meet each other at 6 where they are connected to a fastening member 7 which is suitable to fasten the frame to a tractor or any other carriage. The beams 4 and 5 are interconnected by two cross beams 8 and 9. These cross beams carry bearings for horizontal axles 10 and 11. The axles 10 and 11 are coupled with axles 12 and 13, respectively, via a transmission each consisting of a belt 10a and two belt pulleys 12a and b.

Both latter axles are supported in a gear box 14 in which is supported an axle of a worm wheel enclosed in a wheel guard 15. By means of a handle 16 any given gear ratio between the axles 12 and 13 and the axle of the worm wheel can be selected. The axles 12 and 13 are driven with equal speeds, but in mutually opposite directions of rotation. The worm wheel in the wheel guard 15 is driven by a horizontal worm located at the bottom of said wheel guard, this worm itself being driven by that one of the wheels 1 and 2 which rolls with the greatest speed in forward direction, as may conventionally be obtained by means of pawls between the worm and the axles of said wheels.

The frame carries a tubular arm 17 directed to the left and a similar tubular arm 18 directed to the right. By supporting bars 19 and 20 each arm 17 or 18 is connected to a point of the bridge 3 which point is situated near one of the wheels 1 or 2. Each arm 17 and 18 lies substantially in a vertical plane with one of the cross beams 8 or 9 so that the device as a whole is not symmetrical with regard to the vertical plane comprising the longitudinal axis 27 of the device. The arms 17 and 18 each carry a number of rollers over which an endless belt can move. The belt 21 runs over the rollers supported by the arm 17, and the right extremity of this belt runs over a roller which is fixedly mounted on the axle 11 and drives the belt in such a way that the upper part of the belt moves to the left. The belt 22 runs over the rollers supported by the arm 18. The left extremity of said belt is passed round a driving roller fixed on the axle 10; the uppermost part of this belt runs to the right.

Above the belt 21 as well as above the belt 22 a container for fertilizer is provided, each container being supported by bearings which are not shown in the drawing. Each container 23 and 24 has an opening 25 and 26 extending over the whole width of the associated belt and almost entirely closed by that belt situated at the right or left side, respectively, of the longitudinal axis 27 of the frame. For the sake of clarity only the container 24 is shown in Fig. 2. The belts 21 and 22 have the same shape and the same dimensions. The bearings of these belts are the mirror image of each other. The construction of a belt and bearing is next described with respect to the belt 22.

At a small distance to the right of a vertical plane through the wheel 2, the arm 18 is connected to a tube 29 by means of a hinge 28, said tube being kept in alignment with the tube 18 by means of a tie bar 30 which is connected between an eye 31 secured to the container 23 and an eye 32 on tube 29. In order to give the device, when it is not in operation, a smaller width, the bar 30 and the corresponding bar at the other side of the device are removed and the tube 29 and the corresponding tube at the other side are lifted up and secured in vertical position.

The tubes 18 and 29 each carry a number of vertical strips 33 (see Fig. 3), which are directed downwards, while a horizontal shaft 34 parallel to the axle 10 is fixed to lower ends of the strips 33. About the shaft 34, a roller with five portions 35 of greater diameter and as many thinner grooves 36 is rotatable on ball bearings, and is retained on the shaft by a ring 37, not rotatable on the shaft 34, and a nut 38 screwed upon the free extremity of the shaft 34, which free extremity is provided with a thread. The belt 22 is provided, on one side, with ten ribs 39 fitting in the grooves 36 and running in the longitudinal direction of the belt and, on the other side, with ten gutters running likewise in the longitudinal direction of the belt. Each gutter has a triangular section with a short side 40 and a long side 41, the short side being always situated on the same side as the strip 33. Each gutter section is, therefore, asymmetrical. Each strip 33 further carries a pin parallel to the shaft 34, a roller 42 being rotatably mounted on said pin. The roller 42 has a flange 43 engaging the gutter which is located closest to the strips 33 to prevent the ribs of the belt from leaving the grooves 36 under the influence of lateral forces.

On the shaft 34 near the longitudinal axis 27 of the device, there is a roller for supporting the belt 22 which has ten grooves. The next shaft 34 located to the right of this axis carries a roller with only nine grooves and is accordingly shorter, so that the front edge of the upper part of the endless belt 22 is not supported and will be directed somewhat downwards. Each subsequent shaft 34 to the right, has one groove less than the preceding one, so that the part of the width of the belt which is directed downwards has an increasing width. At the free extremity of the tube 29 is a bar 44 directed downwards and carrying bearings for the axle of a roller 45 which is placed substantially vertically. Around about said roller is the right end of the belt 22 which assumes an almost vertical position. The presence of the roller 45 ensures that at the places where the belt has an opportunity of taking a vertical position, it is obliged to take that vertical position. When the belt is moving, the lowermost part travels entirely free of the roller 45 to the roller on the axle 10 and consequently turns gradually through 90°. The upper part of the belt runs from the roller on the axle 10 to the roller 45, while taking with it an equal quantity of material from the container 24 in each gutter. In order to be able to vary this quantity, each container is provided with a sliding valve. In the container 23 the sliding valve 46 is shown with an adjustable device 47 by which the height of the layer of material in the gutters of the belt 21 can be adjusted. The quantity of material removed by the belt 22 is similarly adjusted. As the upper part of the belt 22 runs flat and substantially horizontal up to a straight line across the free extremities of the shafts 34, but the part of the belt beyond said extremities is substantially vertical, the material carried along in the gutters will be discharged downwards about the line and will be spread across a strip of ground extending over the width of the longitudinal axis 27 of the frame up to the roller 45.

As the folding of the belt cannot be sharp in view of its own stiffness and as thereby the intersection of a gutter on the belt with the line is not sharply defined, the material in a certain gutter might be carried along sometimes farther and sometimes less than intended, dependent on all sorts of circumstances. This might be detrimental to the uniformity of the spreading of the fertilizer. Therefore, in proximity to the free extremities of the shafts 34, scraping members 48 are provided to convey the material from a gutter to another part of the belt from which it drops. The scraping members 48 are shown in Fig. 1 and are mounted in groups on bars 49 which, by means of two horizontal supporting bars 50, are connected to the tube 29.

The quantity of material, spread per unit of length covered by the device while running, depends on the position of the sliding valves (such as the sliding valve 46) and the position of the handle 16.

Figs. 4, 5 and 7 show other scraping members which can be applied in the device according to the Figs. 1-3 instead of the scraping members 48. In these figures is provided a disc 51 for scraping the material from a gutter, said disc being located obliquely in relation to the moving direction of the belt. The axles of these discs are interconnected in groups to a zigzag-shaped bar 52 which bars 52 are supported in the same manner as the bars 49.

Instead of using two separate endless belts, it is possible, as is shown in Fig. 6, to use one single endless belt 53 led over vertical rollers 54. Near the longitudinal axis of the frame, rollers are provided which keep the belt selectively in a substantially horizontal position. The parts of the belt move in the direction of arrows 56 and 57. At zone 55, the belt is loaded with fertilizer from a container (not shown). This material is distributed from edges 58 and 59, and is spread on the ground.

What we claim is:

1. A device for distributing material comprising a mobile frame, a hopper on the frame for storing the material and disbursing the same, a series of coplanar rollers extending outwardly from the frame in successively narrowing relation, a further roller at the outer extremity of the series and positioned substantially perpendicular with respect to the plane of the series, a conveyor belt supported on said series of rollers beneath said hopper and in engagement with said further roller, said further roller urging said belt into a configuration determined by the narrowing rollers for an even distribution of the material and means on said frame for moving said belt.

2. A spreading device for distributing fertilizers and like material comprising: a frame, rollers mounted on said frame, at least one endless conveyor belt supported on said rollers, the longitudinal direction of the belt forming an angle with a vertical plane aligned in the direction of travel of the device, a container for containing the fertilizer to be spread, said container being mounted on said frame for covering said belt with fertilizer, means on said frame for moving said belt and thereby the fertilizer in a predetermined direction over said rollers, said rollers having free ends constituting a row of supports for a portion of said belt, said row making an angle with the longitudinal direction of the belt, a further roller at the outer extremity of said first named rollers depending downwardly from said frame below the plane of said first named rollers and dividing said portion of the belt into two triangular sections lying in two angularly disposed planes, the first of said sections being adapted for carrying fertilizer in the longitudinal direction of the belt, the other section lying below the plane of said first half.

3. A spreading device as defined in claim 2, in which the angle of said row with the longitudinal direction of the belt is less than 30°.

4. A spreading device as defined in claim 2, in which the belt folds over the ends of the rollers, the lengths of the rollers defining the breadths of said first section.

5. A spreading device as defined in claim 2, in which the first section of the belt is provided with a number of parallel gutters on the side thereof facing away from the rollers.

6. A spreading device as defined in claim 4, in which the outer side of the belt is the fertilizer-carrying side and is provided with a number of parallel gutters running in the longitudinal direction of the belt, and comprising series of coaxial supporting rollers mounted on the frame and spaced at equal distances, the number of rollers in a series being substantially equal to the number of gutters in the corresponding portion of said first half and contacting the belt on the inner side thereof.

7. A spreading device as defined in claim 4, in which the supporting rollers are provided with grooves, the lower side of the belt having ribs fitting in said grooves.

8. A spreading device as defined in claim 4, in which the cross section of a gutter on the belt is asymmetrical.

9. A spreading device as defined in claim 2, comprising a row of stripping members positioned above the free ends of the rollers.

10. A spreading device as defined in claim 9, in which a stripping member consists of a rotatable circular disc positioned obliquely in relation to the longitudinal direction of the belt.

11. A spreading device as defined in claim 2, comprising first rollers including vertical axles supporting the endless belt, second rollers including horizontal axles supporting portions of the belt extending between said first rollers, the container being supported on the frame for applying fertilizer to said belt near the middle thereof.

References Cited in the file of this patent

UNITED STATES PATENTS

| | | |
|---|---|---|
| 950,272 | Beasley | Feb. 22, 1910 |
| 983,669 | Beier | Feb. 7, 1911 |
| 1,269,960 | Przednowek | June 18, 1918 |
| 2,236,205 | Wright | Mar. 25, 1941 |
| 2,280,234 | Harvey | Apr. 21, 1942 |
| 2,416,898 | Breeze | Mar. 4, 1947 |
| 2,538,961 | Biszantz et al. | Jan. 23, 1951 |
| 2,647,756 | Allersma | Aug. 4, 1953 |
| 2,743,932 | Wester | May 1, 1956 |

FOREIGN PATENTS

| | | |
|---|---|---|
| 600,770 | Great Britain | Apr. 19, 1948 |